May 9, 1967 F. ULRICH 3,319,224

CIRCUIT ARRANGEMENT TO COMPARE TWO INFORMATION ITEMS

Filed June 7, 1965 3 Sheets-Sheet 1

May 9, 1967 F. ULRICH 3,319,224

CIRCUIT ARRANGEMENT TO COMPARE TWO INFORMATION ITEMS

Filed June 7, 1965

3 Sheets-Sheet 2

May 9, 1967 F. ULRICH 3,319,224

CIRCUIT ARRANGEMENT TO COMPARE TWO INFORMATION ITEMS

Filed June 7, 1965 3 Sheets-Sheet 3

United States Patent Office 3,319,224

Patented May 9, 1967

3,319,224

CIRCUIT ARRANGEMENT TO COMPARE TWO INFORMATION ITEMS

Friedrich Ulrich, Stuttgart-Weilimdorf, Germany, assignor to International Standard Electric Corporation, New York, N.Y., a corporation of Delaware Filed June 7, 1965, Ser. No. 461,814
Claims priority, application Germany, June 20, 1964, St 22,285, 22,287
7 Claims. (Cl. 340—146.2)

ABSTRACT OF THE DISCLOSURE

A circuit arrangement that uses magnetic cores to compare two contradictory codes. Each code is presented by completing signalling circuits on certain leads of different groups of leads. The leads of each group thread individual cores so that each core has one lead of each group threaded therethrough. A supervisory lead threads all of the cores to detect whether or not the compared signals coincide.

The invention relates to circuit arrangements to compare two information items, when the items are, given in opposite or contradictory forms wherein they tend to cancel one another.

Figure 1:
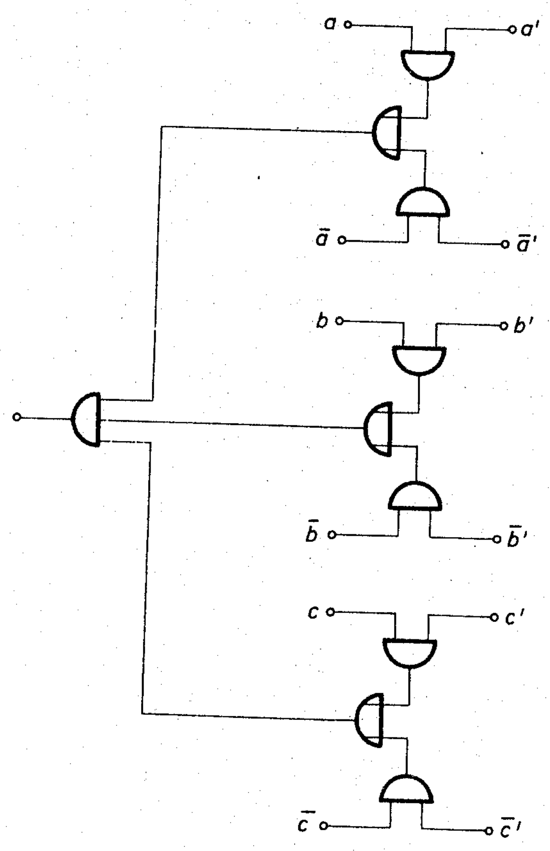

In data processing it is frequently necessary to check two information items, produced by different information sources for coincidence. If both information items are given in the same code, comparison can be made in a simple way. FIG. 1 shows a comparison circuit, known to the art, in a functional block diagram.

When the information items are in a contradictory form of the information items must be compared digit by digit with each other. Two outputs $a$ $\bar{a}$ to $c$, $\bar{c}$ are always associated with each variable $a$, $b$, $c$, of the information items received if in a contradictory form. Therefore six information items $a$, $\bar{a}$, $b$, $\bar{b}$, $c$, $\bar{c}$ and their six contradictory forms $a'$, $\bar{a}'$, $b'$, $\bar{b}'$, $c'$, $\bar{c}'$ must be considered for the three variables $a$, $b$, $c$. Each two contradictory information items are compared in such a way that the variables of both information items (outputs) associated to each other, are checked on their coincidence. Thus, an AND-circuit is associated with each contradictory information item $a$–$a'$; $\bar{a}$–$\bar{a}'$ to $c$–$c'$; $\bar{c}$–$\bar{c}'$. A valid comparison requires that the outputs of the two AND-circuits associated with each variable are followed by an OR-circuit, because with each in one information item the associated variable can be present ($a$) or absent ($\bar{a}$). The outputs of all OR-circuits are checked for coincidence by another AND-circuit. When the supervising circuits for all of the variables $a$, $b$, $c$ must furnish a signal, all of the OR-circuits furnish a signal. It is then that the input information items $a$, $\bar{a}$ to $c$, $\bar{c}$ and $a'$, $\bar{a}'$ to $c'$, $\bar{c}'$ coincide.

This comparing facility known to the art requires a considerable expenditure in logic circuits. The expenditure is increased even more, if the reporting of non-coincidence is also required.

It is the object of the invention to find a circuit arrangement to compare two information items which are given in a contradictory form. The circuit must also identify non-coincidence of information items. The identification must be accomplished using inexpensive logical circuits.

The circuit arrangement, according to the invention, compares two information items, given in a contradictory form: Each variable of the first information influences a magnetic crosspoint element. The contradictory variable of the second information influences the magnetic crosspoint elements in the opposite direction. A supervising loop, led through all magnetic crosspoint elements is used to derive, a signal, if both information items coincide.

An embodiment of the inventive circuit arrangement provides that the magnetic crosspoint elements are saturated in one or the other direction by the information items to be compared. All magnetic crosspoint elements are saturated only, if both information items coincide. The supervising loop is therefore low-ohmic. According to the invention a pulse generator and an indicator are connected to the supervising loop. The pulse generator furnishes an impulse when both information items are compared. The positive signalling enables the pulse generator to be supervised simultaneously, because in case of a failure the output signal is missing, even if both information items coincide. The output signal, of course, indicates the coincidence. The comparison is made in such a way that the pulse generator furnishes an impulse only when both information items are present. In many cases it is desirable to magnetize the magnetic crosspoint elements. Then the associated control windings of the magnetic crosspoint elements are short-circuited to correspond to the information items applied through the information leads.

Another possibility of fault in the comparing arrangement occurs when a magnetic crosspoint element fails. For example, an erroneous indication is given when there is short-circuit of the windings. This fault source is eliminated by passing the supervising loop through all magnetic crosspoint elements in the same direction or sense, and by providing a control loop through one half of the magnetic crosspoint element in the same sense as the supervisory loop and through the other half of the element in the opposite sense. When the receipt of information items terminates, the pulse generator provides an impulse to the supervising loop whereby the output signal of the control loop is checked. The coincidence of both information items to be compared is indicated, when a signal appears on the supervising loop responsive to the comparison of both information items, and no signal appears on the control loop after the comparison.

According to a further embodiment of the circuit arrangement of the invention the comparison may be obtained directly in one step. The circuit arrangement has a common magnetic crosspoint element associated with each variable of both information items. During the comparison the magnetic crosspoint elements are magnetized by signals on the first control leads corresponding to the first information and rendered ineffective by signals on the second control leads corresponding to second information. The coincidence of both information items is checked using a checking loop passing through all magnetic crosspoint elements in the same sense. It is therefore sufficient to provide one magnetic crosspoint element, e.g. a magnetic core, for each variable of the information items. The checking facility is then obtained in a simple manner by suitably looping the control leads and one supervising loop. The comparing of both information items is initiated according to the invention in that an interrogating pulse is led to all first control leads via resistors, and in that the second control leads can be short-circuited responsive to the second information item. A further embodiment of the arrangement according to the invention is characterized in this that the magnetic crosspoint elements can be saturated by signals on the second control leads to the second information. It is thereby provided that these second control leads are concentrated via resistors and connected to a voltage source.

Figure 2:
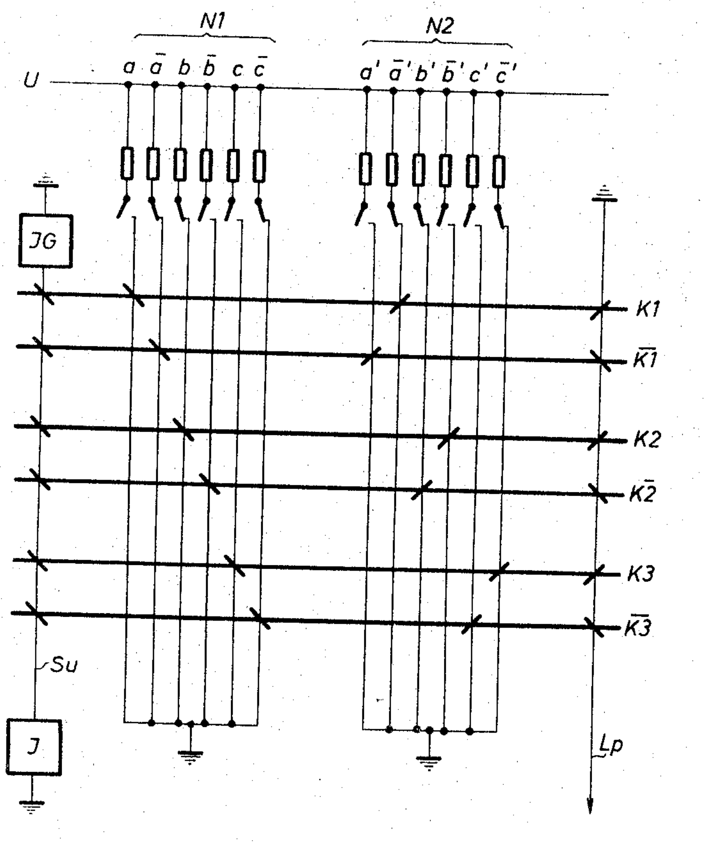
Figure 3:
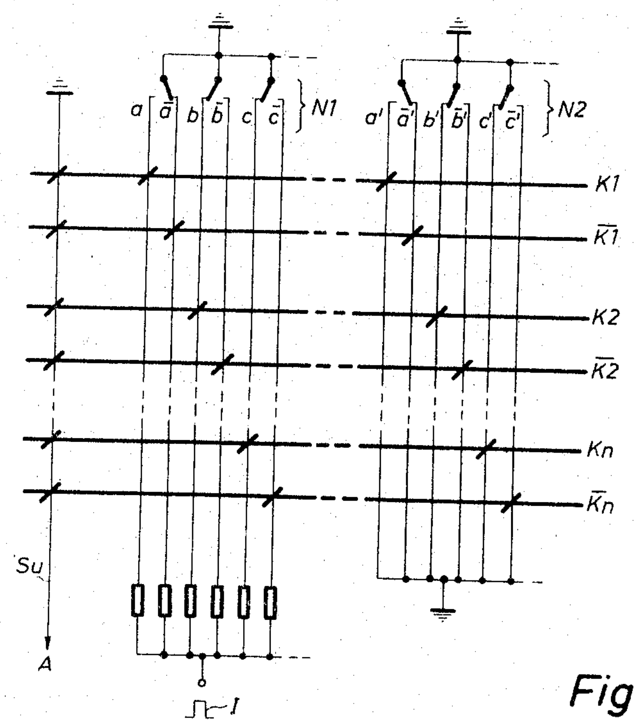

The invention is now in detail explained with the aid of the accompanying drawings, wherein:

FIG. 1 shows the circuit arrangement for comparison known to the art with logical circuits, FIG. 2 shows the circuit arrangement to compare two information items received in a contradictory form according to the invention, and FIG. 3 shows a modified circuit arrangement according to the invention.

The arrangement known to the art and shown in FIG .1 was already explained in the preamble of the description, so that the arrangement according to the invention can now immediately be described. In the example represented on the drawing the magnetic cores K1, $\overline{K1}$, K2, $\overline{K2}$, K3 and $\overline{K3}$ are represented as horizontal thick lines. The control leads of both information items are drawn as vertical thin lines. The oblique lines at the crosspoints indicate that the respective line passes through the magnetic core. The different oblique position indicates the different direction of threading.

If, for example, the information $N1=\overline{a}+b+\overline{c}$ is applied, the magnetic cores $\overline{K1}$, K2 and $\overline{K3}$ are brought to saturation via the feeder voltage U and the series resistors. When the information N2 to be compared is identical with the applied information N1 the magnetic cores K1, $\overline{K2}$, and K3 are brought into the opposite saturation range via the control leads $\overline{a}'$, $b'$, and $\overline{c}'$. The interrogating pulse is furnished by the pulse generator IG. All windings of the supervising loop S*u* are low-ohmic because of the saturated condition of the cores, so that the interrogating pulse can pass through to the indicator I. In order to assure that the windings of the magnetic cores are in proper order and that the arrangement operates correctly the pulse generator IG applies an impulse on the supervising loop S*u* even when the information items N1 and N2 are disconnected. This impulse is transferred into the control loop L*p* via all magnetic cores K1 to $\overline{K3}$. Due to the alternating direction of threading of the control loop L*p* through the magnetic cores K1, K2, K3 and $\overline{K1}$, $\overline{K2}$, $\overline{K3}$ all pulses induced in the control loop are cancelled so that no output signal appears. This is the criterion indicating that all of the magnetic cores are in proper condition.

If both information items do not coincide the arrangement operates as follows:

If in the information represented by the signals on the leads of group N1, the variable $\overline{a}$ is missing, then the magnetic core $\overline{K1}$ is not saturated. The winding of the supervising loop S*u* remains highly resistant to the interrogating pulse of the pulse generator IG. The indicator I does not respond, thereby indicating that both information items applied are not identical.

Another possibility of error is that, the variable $a'$ for example can be in the second information represented by the signals on the leads of group N2. Since the variable $\overline{a}$ of the information N1 magnetized the magnetic core $\overline{K1}$ in the opposite direction that the variable $a'$ of the information N2 would do, the magnetic core $\overline{K1}$ remains unsaturated and the associated winding of the supervising loop S*u* represents a high resistance. The indicator I does not respond, when the information items do not coincide.

If two different but distinct information items are given, the magnetic cores are either not magnetized at all or are actuated from both information items in the opposite direction. In any case the associated windings of the supervising loop S*u* remain highly resistant to current flow for the interrogating pulse.

If a magnetic core has an interturn short circuit winding, the arrangement does not operate properly. The associated winding of the supervising loop then always presents a diode impedance value, independent of both information items.

If for example, the variable $\overline{c}$ of the information items of group N1 is missing the magnetic core $\overline{K3}$ remains unsaturated. When a faulty winding is associated this magnetic core, the winding of the supervising loop of said magnetic core is low-ohmic. The indicator I therefore responds and indicates the coincidence of both information items, despite the missing variable $\overline{c}$. In order to eliminate this possibility of a fault, the pulse generator IG is switched on again after both information items are cut off. The interrogating pulse cannot be transmitted into the loop L*p* via the magnetic core $\overline{K3}$. A complete cancellation of all induced pulses does not occur. The loop L*p* therefore furnishes an output signal which indicates that the arrangement is faulty and that the previously furnished indication "coincidence" does not apply.

The positive output signal "coincidence" on the supervising loop S*u* is also advantageous in that the pulse generator IG is automatically supervised in common. If the generator fails the output signal at the indicator I is missing, even if both information items N1 and N2 actually coincide.

The arrangement can also be modified in such a way that the information variables $a$, $\overline{a}$ to $c$, $\overline{c}$ and $a'$, $\overline{a}'$ to $c'$, $\overline{c}'$ just short-circuit the associated windings of the magnetic cores K1 to $\overline{K3}$ or let them open at all. This leads to the same effect in the supervising loop S*u*.

The modified comparison or comparing arrangement according to FIG. 3 provides magnetic crosspoint elements K1, $\overline{K1}$, K2, $\overline{K2}$ to K*n*, $\overline{Kn}$ to determine the coincidence of two information items N1 and N2 given in the contradictory form via switch-over contacts, for example.

As indicated by switch-over contacts the information items $\overline{a}$, $b$, $c$, and $\overline{a}'$, $b'$, $c'$ are to be compared. The variables $a$, $\overline{b}$, $\overline{c}$ and $a'$, $\overline{b}'$, $\overline{c}'$, respectively are not compared in our example so that the magnetic cores K1, $\overline{K2}$, $\overline{K3}$ are not influenced. The control leads having the signals representing the input information of group N1 are isolated via resistors. When comparing both information items an interrogating pulse I is led to the control leads of the said line group N1. The magnetic cores $\overline{K1}$, K2, K*n* are actuated, because the contacts supplying the information items of group N1 are closed. However, exactly the same magnetic cores are rendered ineffective by the contacts providing the information items to the leads of group N2 which pass through all magnetic cores in the same direction. The magnetic cores are thereby rendered ineffective that the windings are short-circuited via the closed control circuits of the information N2. It is also possible to drive the magnetic cores to saturation prior to comparison and corresponding to the information items represented by group N2 via a constantly applied voltage source. When applying the interrogating pulse I to the control leads of the information item of group N1 no magnetic core can be magnetized in the other sense. In this comparing method, too, an output signal on the supervising loop S*u* is missing, thereby indicating that both information items coincide.

If both information items deviate from each other the short-circuit or the pre-excitation via the control leads of information item group N2 is ineffective for at least one magnetic core, having been controlled by the signals on the leads of group N1. The magnetic core is thus magnetized in the other direction through the interrogating pulse I. An impulse is thereby induced into the supervising loop S*u*, which impulse occurs at the output A indicating the non-coincidence of information items of groups N1 and N2.

The dotted lines in the accompanying drawing FIG. 3 indicate that the arrangement according to the invention is applicable for an arbitrary number of digits of the information items. Only one magnetic crosspoint element must be provided for each variable of said information items. In case three-digit binary codes should be compared the representation of the code signals in contradictory form require six control leads, i.e. six variables. Consequently the comparing arrangement according to the invention shows six magnetic cores.

While I have described above the principles of my invention in connection with specific apparatus, it is to be clearly understood that this description is made only by way of example and not as a limitation to the scope of my invention as set forth in the objects thereof and in the accompanying claims.

What I claim is:

1. A circuit arrangement for comparing contradictory information items wherein each of said items are composed of binary pairs of variables including the variables and the not functions of said variables, said arrangement comprising a plurality of pairs of square loop mangetic elements with one of said elements of each pair associated respectively with a variable and a not function of the said variable, a plurality of groups of leads, each group having one lead for each variable and not function of each variable, each of said leads threading through one of the magnetic elements thereby associating the element with the variable represented by said lead, means for applying signals to certain of said leads of one of said groups to represent an information item, means for applying signals to certain of said leads of another of said groups to represent a contradictory information item, and supervisory means including a supervisory lead threading all of said elements for determining whether or not there is a coincidence between said information item and said contradictory information item.

2. A circuit arrangement according to claim 1, wherein said supervisory means comprise pulse generator means coupled to the input of said supervisory lead for providing a pulse when said information items are compared, and indicator means coupled to the output of said supervisory lead to indicate the receipt of a pulse responsive to coincidence between said information item and said contradictory information item.

3. A circuit arrangement according to claim 2, wherein said supervisory lead threads all of said elements in the same sense, and wherein a control lead is provided which threads one half of said magnetic element in one sense and the other half of said magnetic elements in the opposite sense whereby when said signals are not applied to said leads and the pulse is applied to said supervisory lead the output pulse of the control lead is supervised.

4. A circuit arrangement according to claim 3, wherein the means for applying signals to certain of said leads comprises switch means for directing current flow through certain of said leads of said one of said groups and through certain of said leads of said another of said groups, said current carrying leads threaded through certain of said elements to represent said information item and through the rest of said elements to represent said contradictory information item whereby all of said elements are saturated to enable said pulse to reach said indicator when the information item and contradictory information item coincide.

5. The circuit arrangement of claim 1, wherein said contradictory information item signals comprise short circuits of the leads of the another one of said groups, and wherein the leads of the said another one of said groups are threaded in the same sense through each of the same magnetic elements threaded by the leads of the one of said groups.

6. The circuit arrangement of claim 5, wherein said means for applying signals includes switching means for connecting pulses to certain of the leads of said group representing said information item and for short circuiting certain of the leads of said group representing said contradictory information item.

7. The circuit arrangement of claim 6, wherein said supervisory lead is grounded at one end and is threaded through all of said elements in the sense opposite to the leads of said groups.

References Cited by the Examiner

UNITED STATES PATENTS

| | | | |
|---|---|---|---|
| 2,905,931 | 9/1959 | Lubkin | 340—174 |
| 2,973,508 | 2/1961 | Chadurjian | 340—174 |
| 3,136,977 | 6/1964 | Lamy et al. | 340—149 |
| 3,195,108 | 7/1965 | Franck | 340—146.2 |
| 3,222,645 | 12/1965 | Davis | 340—146.2 |
| 3,239,810 | 3/1966 | Jacoby | 340—146.2 |

MALCOLM A. MORRISON, *Primary Examiner.*

K. MILDE, *Assistant Examiner.*